US012625879B2

(12) United States Patent
Estanislao et al.

(10) Patent No.: US 12,625,879 B2
(45) Date of Patent: May 12, 2026

(54) SYSTEM FOR OPTIMIZING STORAGE REPLICATION IN A DISTRIBUTED DATA ANALYSIS SYSTEM USING HISTORICAL DATA ACCESS PATTERNS

(71) Applicant: Google LLC, Mountain View, CA (US)

(72) Inventors: Alejandra Estanislao, Paris (FR);
Purujit Saha, Gold Bar, WA (US);
Alan Pearson, Seattle, WA (US);
Andrew Hitchcock, Seattle, WA (US)

(73) Assignee: Google LLC, Mountain View, CA (US)

( * ) Notice: Subject to any disclaimer, the term of this patent is extended or adjusted under 35 U.S.C. 154(b) by 869 days.

(21) Appl. No.: 16/107,452

(22) Filed: Aug. 21, 2018

(65) Prior Publication Data

US 2020/0065415 A1 Feb. 27, 2020

(51) Int. Cl.
| | |
|---|---|
| *G06F 16/27* | (2019.01) |
| *G06F 16/21* | (2019.01) |
| *G06F 16/23* | (2019.01) |
| *G06F 16/28* | (2019.01) |
| *G06F 17/10* | (2006.01) |

(52) U.S. Cl.
CPC ............ *G06F 16/27* (2019.01); *G06F 16/219* (2019.01); *G06F 16/2358* (2019.01); *G06F 16/285* (2019.01); *G06F 17/10* (2013.01)

(58) Field of Classification Search
CPC ...................................................... G06F 16/27
USPC ................................................ 707/610, 510
See application file for complete search history.

(56) References Cited

U.S. PATENT DOCUMENTS

| | | | |
|---|---|---|---|
| 6,868,439 B2 | 3/2005 | Basu et al. | |
| 7,305,392 B1 * | 12/2007 | Abrams | G06Q 10/10 707/999.009 |
| 7,460,549 B1 * | 12/2008 | Cardei | H04W 28/26 370/310.1 |
| 8,156,163 B1 * | 4/2012 | Hamilton | G06F 3/0635 707/812 |
| 9,633,073 B1 * | 4/2017 | Allen | G06F 16/2462 |
| 9,851,911 B1 * | 12/2017 | Schuller | G06F 3/0665 |
| 10,585,931 B1 * | 3/2020 | Young | G06F 16/248 |
| 10,691,700 B1 * | 6/2020 | Agrawal | G06F 16/2282 |

(Continued)

FOREIGN PATENT DOCUMENTS

| | | |
|---|---|---|
| CN | 105763631 A | 7/2016 |
| CN | 107408114 A | 11/2017 |

OTHER PUBLICATIONS

Renato Porfirio Ishii and Rodrigo Fernandes De Mello, An Online Data Access Prediction and Optimization Approach for Distributed Systems, IEEE Transaction on Parallel and Distributed Systems, vol. 23, No. 6, Jun. 2012, pp. 1017-1029.

(Continued)

*Primary Examiner* — Muluemebet Gurmu
(74) *Attorney, Agent, or Firm* — Lerner David LLP

(57) ABSTRACT

Historical analysis of query patterns is used to discover relationships between data sets. These relationships are used to make optimal decisions about where to place data in a globally distributed environment in which locality of data is an important factor in providing good query performance. A mixed integer programming model is used to solve a constraint based system which balances the need to have data kept local with other data and the cost of replicating data across a low-bandwidth network.

17 Claims, 6 Drawing Sheets

(56) References Cited

U.S. PATENT DOCUMENTS

| | | | | |
|---|---|---|---|---|
| 2005/0262298 | A1* | 11/2005 | Lubbers | G06F 11/2079 |
| | | | | 711/170 |
| 2006/0123167 | A1* | 6/2006 | Jeppsen | G06F 3/061 |
| | | | | 710/310 |
| 2009/0307205 | A1* | 12/2009 | Churchill | G06F 16/9535 |
| | | | | 707/999.005 |
| 2010/0110491 | A1* | 5/2010 | Murase | G06F 3/1225 |
| | | | | 358/1.15 |
| 2010/0299343 | A1* | 11/2010 | Ahari | G06F 16/9535 |
| | | | | 707/754 |
| 2011/0087792 | A2* | 4/2011 | Wayda | H04L 69/24 |
| | | | | 709/230 |
| 2012/0233117 | A1* | 9/2012 | Holt | G06F 16/1748 |
| | | | | 707/620 |
| 2012/0322422 | A1* | 12/2012 | Frecks, Jr. | G06F 21/577 |
| | | | | 455/414.1 |
| 2013/0024443 | A1 | 1/2013 | Achuthan et al. | |
| 2013/0290249 | A1* | 10/2013 | Merriman | G06F 16/278 |
| | | | | 707/610 |
| 2015/0178273 | A1* | 6/2015 | Hakkani-Tur | G06F 40/40 |
| | | | | 704/9 |
| 2015/0186411 | A1* | 7/2015 | Iliadis | H04L 67/1097 |
| | | | | 707/637 |
| 2015/0261886 | A1* | 9/2015 | Wu | G06F 16/285 |
| | | | | 707/798 |
| 2015/0310097 | A1* | 10/2015 | Achuthan | G06F 16/3331 |
| | | | | 707/722 |
| 2017/0249325 | A1* | 8/2017 | Vangala | G06F 16/9024 |
| 2018/0130019 | A1* | 5/2018 | Kolb | G06F 16/24578 |
| 2018/0218734 | A1* | 8/2018 | Somech | G10L 15/05 |
| 2019/0286757 | A1* | 9/2019 | Muntés-Mulero | G06F 11/079 |
| 2019/0324899 | A1* | 10/2019 | Kulkarni | G06F 3/0653 |

OTHER PUBLICATIONS

Husni Hamad E. Al-Mistarihi and Chan Huah Yong, On Fairness, Optimizing Replica Selection in Data Grids, IEEE Transactions on Parallel and Distributed Systems, vol. 20, No. 8, Aug. 2009, 11 pages.

William H. Bell et al., Optorsim a Grid Simulator for Studying Dynamic Data Replication Strategies, Istituto Trentino di Cultura, Jun. 2003, 22 pages.

International Preliminary Report on Patentability for International Application No. PCT/US2019/043389 dated Mar. 4, 2021. 9 pages.

Tran, Duc A. et al. "S-CLONE: Socially-aware data replication for social networks." Computer Networks. vol. 56. No. 7. May 2012 (May 2012), pp. 2001-2013. XP055620949. Amsterdam, NL. ISSN : 1389-1286 . DOI : 10.1016/j.comnet.2012.02.010.

Khan et al. "Comparison and analysis of ten static heuristics-based Internet data replication techniques." Journal of Parallel and Distributed Computing. Elsevier. Amsterdam, NL. vol. 68, No. 2, Jan. 5, 2008 (Jan. 5, 2008), pp. 113-136, XP022410957, ISSN: 0743-7315, DOI: 10.1016/J.JPDC.2007.06.009.

International Search Report and Written Opinion for International Application No. PCT/US2019/043389 dated Oct. 2, 2019. 15 pages.

First Examination Report for Indian Patent Application No. 202147005249 dated Jan. 11, 2022. 7 pages.

Office Action for European Patent Application No. 19753223.7 dated Aug. 29, 2022. 14 pages.

First Office Action for Chinese Patent Application No. 201980052412.0 dated Mar. 4, 2024. 9 pages.

Office Action for European Patent Application No. 19753223.7 dated Dec. 4, 2024. 11 pages.

Abdurrab et al. FIRE: A File Reunion Based Data Replication Strategy for Data Grids. Cluster, Cloud and Grid Computing (CCGrid), 2010 10th IEEE/ACM International Conference on, Jan. 1, 2010 (Jan. 1, 2020), pp. 215-223, Piscataway, NJ, USA, DOI: 10.1109/CCG RI D.2010.12. Retrieved from the Internet: <https://ieeexplore.ieee.org/stampPDF/getPDF.jsp?tp=&arnumber=5493478&ref=aHR0c HM6Ly9pZWVleHBsb3JlLmllZWUub3JnL2RvY3VtZW50LzO0 OTMONzg=>.

Notice of Grant for Chinese Patent Application No. 201980052412.0 dated Jan. 1, 2025. 4 pages.

Zhang et al. Personalized Instructing Recommendation System Based on Web Mining. Dec. 12, 2008. The 9th International Conference for Young Computer Scientists, pp. 2517-2521.

Researching and Implementing of Hadoop Platform-based Distributed Web Log Analysis System. Jan. 15, 2018. 64 pages.

Second Office Action for Chinese Patent Application No. 201980052412.0 dated Aug. 16, 2024. 7 pages.

* cited by examiner

600

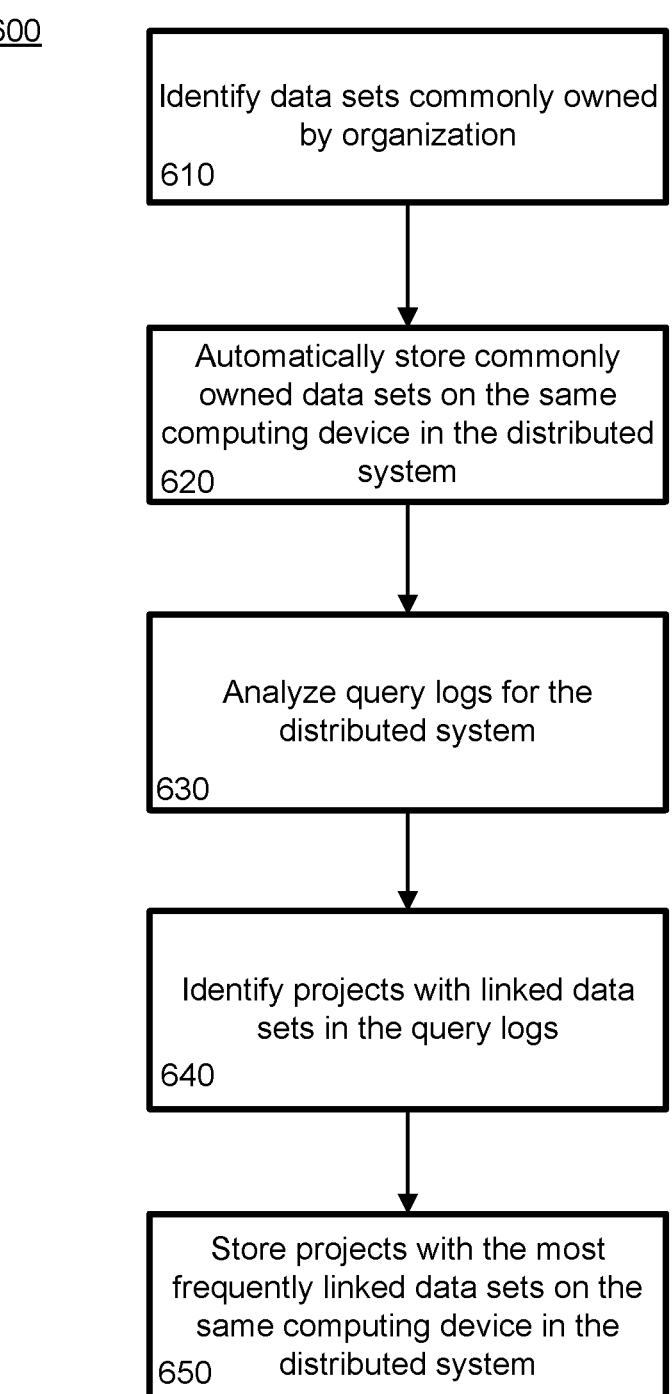

Identify data sets commonly owned
by organization
610

Automatically store commonly
owned data sets on the same
computing device in the distributed
620          system Analyze query logs for the
distributed system
630

Identify projects with linked data
sets in the query logs
640

Store projects with the most
frequently linked data sets on the
same computing device in the
650          distributed system

Fig. 6

SYSTEM FOR OPTIMIZING STORAGE REPLICATION IN A DISTRIBUTED DATA ANALYSIS SYSTEM USING HISTORICAL DATA ACCESS PATTERNS

BACKGROUND

Cloud computing systems sometimes include a distributed data analysis engine, which operates in multiple data centers distributed globally. Each data center contains one or more servers. Users of such cloud computing systems may create organizations and projects. Within a project, the distributed data analysis engine allows users to create data sets and tables. Internally, tables are partitioned into units of data replication, called storage sets. Each storage set corresponds to one or more files stored on a server. While users typically query their own data sets, it is also possible for one user to share data sets with another user or make them publicly available to many users. Multiple data sets may be joined together at query time, which potentially requires the system to read data from a large number of distinct data sets, possibly belonging to arbitrary users.

When evaluating a query, the distributed data analysis engine executes a set of processes within a specific server. These processes read the storage set files described above and perform most efficiently when the files being read are stored on the same server that is running the analysis processes. Reading data from a remote server is inherently more expensive and involves higher latency. The amount of available bandwidth for cross-server data transfer is also limited and is a scarce resource. Due to these limitations, in some systems cross-server reads exceeding a small limit are disabled and all of the data being processed by the analysis processes must be present in the local server.

In order to provide fault tolerance, redundancy and high availability, some systems replicate all storage sets to every server in which the analysis processes may be run. However, replicating data to every server in use is problematic because it is costly in terms of the amount of data transfer needed as the number of servers in use grows. Each additional server would add linear growth in the volume of data transfer and so would not be scalable. Moreover, replicating data to every server is further problematic because it imposes a ceiling on growth of system's storage capabilities, since the system would be capped by the available storage size of the smallest server in use.

BRIEF SUMMARY

The present disclosure provides a method for optimizing replicated data storage. The method includes identifying, with one or more processors, data sets commonly owned by an organization, automatically storing the commonly owned data sets on a same computing device in a distributed computing system, analyzing, with the one or more processors, query logs for the distributed computing system, identifying, with the one or more processors, projects with linked data sets in the query logs, and storing, with the one or more processors, the projects with the most frequently linked data sets on the same computing device in the distributed computing system.

According to some examples, the method may further include generating, with the one or more processors, a graph, wherein each of the identified projects is represented by a node in the graph, and wherein a number of times two of the identified projects were linked in the query logs is represented by a weighted edge between the nodes presenting the two projects. Clusters of projects connected by edges having weights greater than a predetermined threshold may be identified, wherein storing the projects with the most linked data sets comprises storing the identified clusters.

According to other examples, the method may include using a mixed integer programming model to identify clusters of projects based on linear relationships between projects. Constraints for the mixed integer programming model may include storage and compute capacities for each server, storage and compute requirements of each cluster, cumulative storage and compute requirements for each cluster must not exceed the storage and compute capacities for the server assigned to the cluster, each cluster has multiple replicas which must be stored on separate servers, data should remain on a server where it is already located where possible. An assignment map may be generated based on an output of the mixed integer programming model, the assignment map indicating where to store each cluster. Data transfer operations required to implement the assignment map may be determined, ensuring that an amount of available storage in the servers is not exceeded when data is copied from a source server to a destination server.

Another aspect of the disclosure provides a system for optimizing replicated data storage. The system includes one or more memories storing a log of transactions between data sets in a distributed computing system over a period of time; and one or more processors in communication with the one or more memories. The one or more processors are configured to identify data sets commonly owned by an organization, automatically store the commonly owned data sets on a same computing device in the distributed computing system, analyze the log for the distributed computing system, identify, based on the analysis of the log, projects with linked data sets, and store the projects with the most frequently linked data sets on the same computing device in the distributed computing system.

Another aspect of the disclosure provides a computer readable medium storing instructions executable by a processor for performing a method of optimizing replicated data storage. The method includes identifying data sets commonly owned by an organization, automatically storing the commonly owned data sets on a same computing device in a distributed computing system, analyzing query logs for the distributed computing system, identifying projects with linked data sets in the query logs, and storing the projects with the most frequently linked data sets on the same computing device in the distributed computing system.

BRIEF DESCRIPTION OF THE DRAWINGS

FIG. 6 is a flow diagram illustrating an example method according to aspects of the disclosure.

DETAILED DESCRIPTION

Overview

Figure 1:
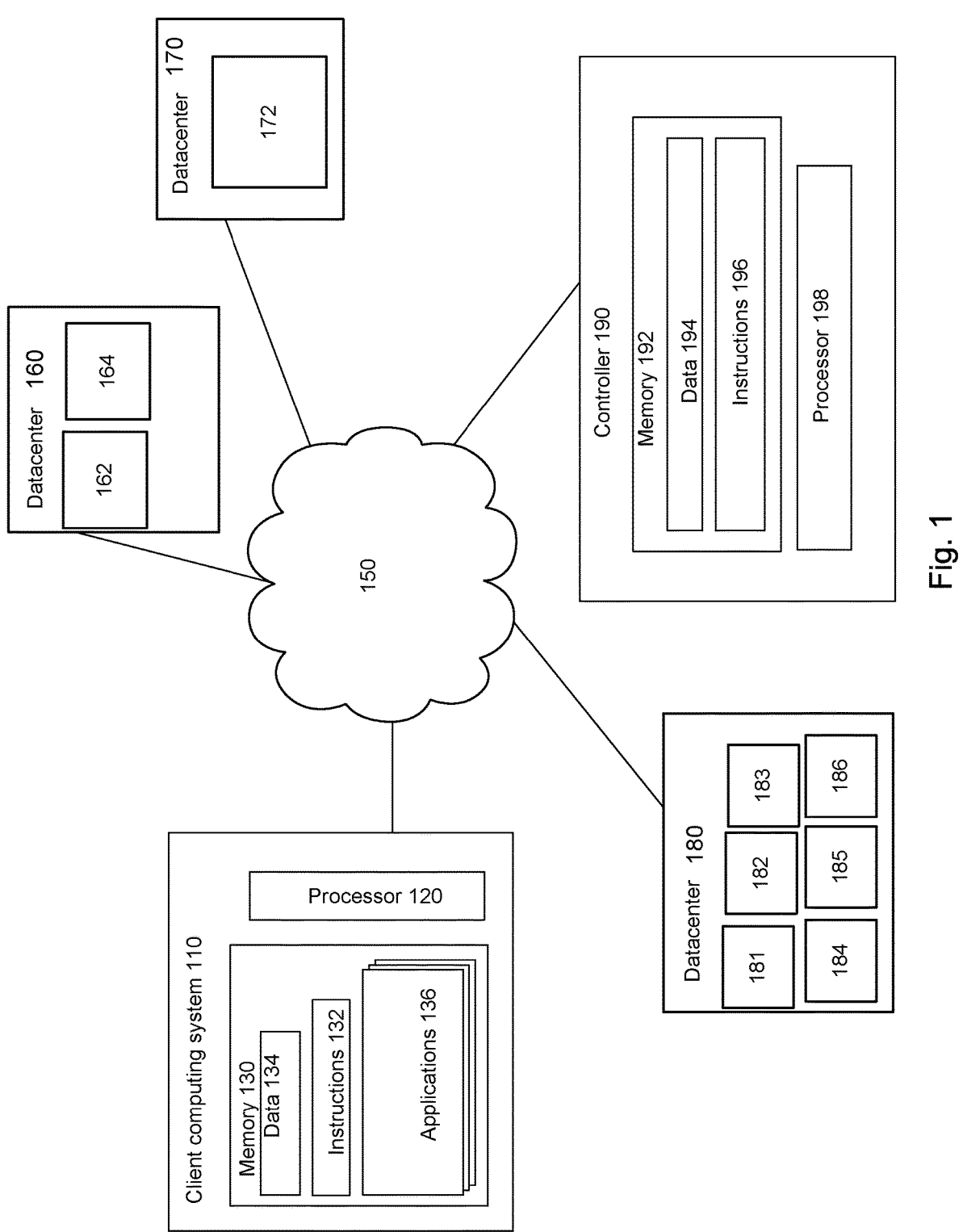
FIG. 1 is a block diagram of an example distributed computing system according to aspects of the disclosure.

The present disclosure describes a system that uses historical analysis of query patterns to discover relationships between data sets. These relationships are used to make optimal decisions about where to place data in a globally distributed environment in which locality of data is an important factor in providing good query performance A mixed integer programming model is used to solve a constraint based system which balances the need to have data kept local with other data and the cost of replicating data across a low-bandwidth wide area network (WAN).

According to one example implementation, the system includes an Assignment Planner and a Replication Controller. These entities may be modules within a computing device which perform particular processes, as described below. The Assignment Planner and Replication Controller work cooperatively to implement a replication strategy to replicate user data to a fixed number of servers out of the total possible number of servers available. By replicating to only a subset of the servers, rather than every server, there is a fixed limit on the amount of replication needed for each new storage set. The number of servers in the subset may be predetermined, for example, based on needs for redundancy. Additionally the total amount of storage required by the system is substantially reduced. By way of example only, in a system involving 5 servers in use, previous replication techniques required 5 replicas of every storage set. In contrast, the system described herein may choose to replicate to only 2 out of 5 servers. Each server would then on average contain only 40% of the data volume required by the previous system.

Replicating data to only a subset of servers creates a possible need to read data that is stored on remote servers. While remote reads are possible, they happen at a significant performance penalty and are subject to much greater throughput limitations. To minimize these effects, the system minimizes the number of remote reads. In particular, data which is likely to be joined by a user's queries is kept together, while still making it possible to join any piece of a first user's data against a second user's data.

In minimizing the potential for remote requests, the system automatically places all storage sets owned by a same organization in the same server. An analysis of query logs is performed to identify historical data access patterns, which are used to predict future behavior. For example, the system will examine the query logs to determine which data sets tend to appear in queries together most frequently and attempt to replicate those data sets into the same servers. Users may have one or more organizations or projects, and they can organize their data within said organizations in order to keep their data locally available.

On a periodic basis, the Assignment Planner queries metadata catalogs of the storage sets to determine the amount of data stored by each project. For example, such analysis may be performed every few hours, every few days, etc. The Assignment Planner also queries for project/organization relationships and groups all projects which are part of the same organization together. It queries the job log to find instances where data from one project (or organization) was linked with data from a different project (or organization). This query sums the volume of data transfer done by queries made in the past, such as the past several days, to assign a weight to the relationship between the projects.

The Assignment Planner may use a Greedy Solver, assuming that data sets should not be moved when possible. In this example, a graph connected components algorithm may be used to cluster projects together based on these relationships. The projects represent nodes in the graph and the query history is used to construct weighted edges in the graph. The connected components algorithm finds clusters of projects which are connected by edges with weights greater than a certain threshold. These clusters represent sets of projects which are related and should be stored on the same server. In some examples, two different connected components passes are run. The first one establishes relationships between projects based on sharing common reservations, wherein a reservation is a pre-allocated set of computing resources that customers can purchase and reserve for their own use. The second pass uses the historical analysis of query logs to relate projects based on query history and being joined together.

In another example, the Assignment Planner may use a mixed integer programming model to solve a constraint based problem of where to store each cluster. In this example, the relationships between related projects are expressed as linear constraints. Constraints for the mixed integer programming model may include: 1) Each server has a storage and compute capacity; 2) Each project cluster has a storage requirement and a compute requirement; 3) The sum of storage and compute requirements of project clusters assigned to a server cannot exceed the servers storage and compute capacity; 4) Each project cluster has multiple replicas of the data which must be stored on separate servers; 5) When any server is taken out of service or "drained," the remaining servers must take up the load formerly on the drained server; and 6) Where feasible, data should remain on the server where it is already located to minimize the cost of data transfer. The model produces an assignment map that maps each project cluster to a server. This is the output of the Assignment Planner.

The Replication Controller determines a replication plan based on the assignment map and the current state of assignments. The replication plan identifies data transfer operations that would be necessary to implement the new assignment map. This includes some number of data copy operations, as well as data removal operations to reclaim unused space. The replication plan takes into account intermediate storage capacities, such that an amount of available storage is not exceeded even during times when data is in transit and may temporarily have more copies of the data than is needed in the static state. For example, when data for a project is being transferred from a source server to a destination server, it may temporarily be copied to both the source server and the destination server. The Replication Controller ensures that both the source server and the destination server have adequate storage capabilities to accommodate the transfer.

While the concepts described herein may be used to manage data replicated on a plurality of servers, it should be understood that such concepts may also be applied to other network architectures, such as those utilizing "cells." For example, a cell is a network of tightly connected computing devices that, by way of example, may cooperatively run processes, has shared storage, and has very low network latency and high throughput between computing devices in the cell. Accordingly, while the examples herein are primarily described with respect to assigning projects to particular servers, it should be understood that the examples similarly apply in assigning projects to cells or other computing devices or groups of computing devices.

Example Systems

FIG. 1 illustrates an example system including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

The datacenters 160-180 may be positioned a considerable distance from one another. For example, the datacenters may be positioned in various countries around the world. Each datacenter 160, 170, 180 may include one or more computing devices, such as processors, servers, shards, cells, or the like. For example, as shown in FIG. 1, datacenter 160 includes computing devices 162, 164, datacenter 170 includes computing device 172, and datacenter 180 includes computing devices 181-186. Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

In some examples, each datacenter 160-180 may also include a number of storage devices (not shown), such as hard drives, random access memory, disks, disk arrays, tape drives, or any other types of storage devices. The datacenters 162, 172, 182 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above. In other examples, such operations may be performed by one or more of the computing devices in one of the datacenters 160-180, and an independent controller may be omitted from the system.

Each client 110 may be, for example, a computer intended for use by a person or an entity. The client 110 may have all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a relational database as a table having a plurality of different fields and records, or XML documents. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Applications 136 may be used for any of a variety of operations. The applications 136 may, for example, be downloaded, executable from the instructions 132, or remotely accessed. In some examples, the application may be remotely executed. For example, applications on the client device may be executed in the cloud.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

Client 110, datacenters 160-180, and control 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Figure 2:
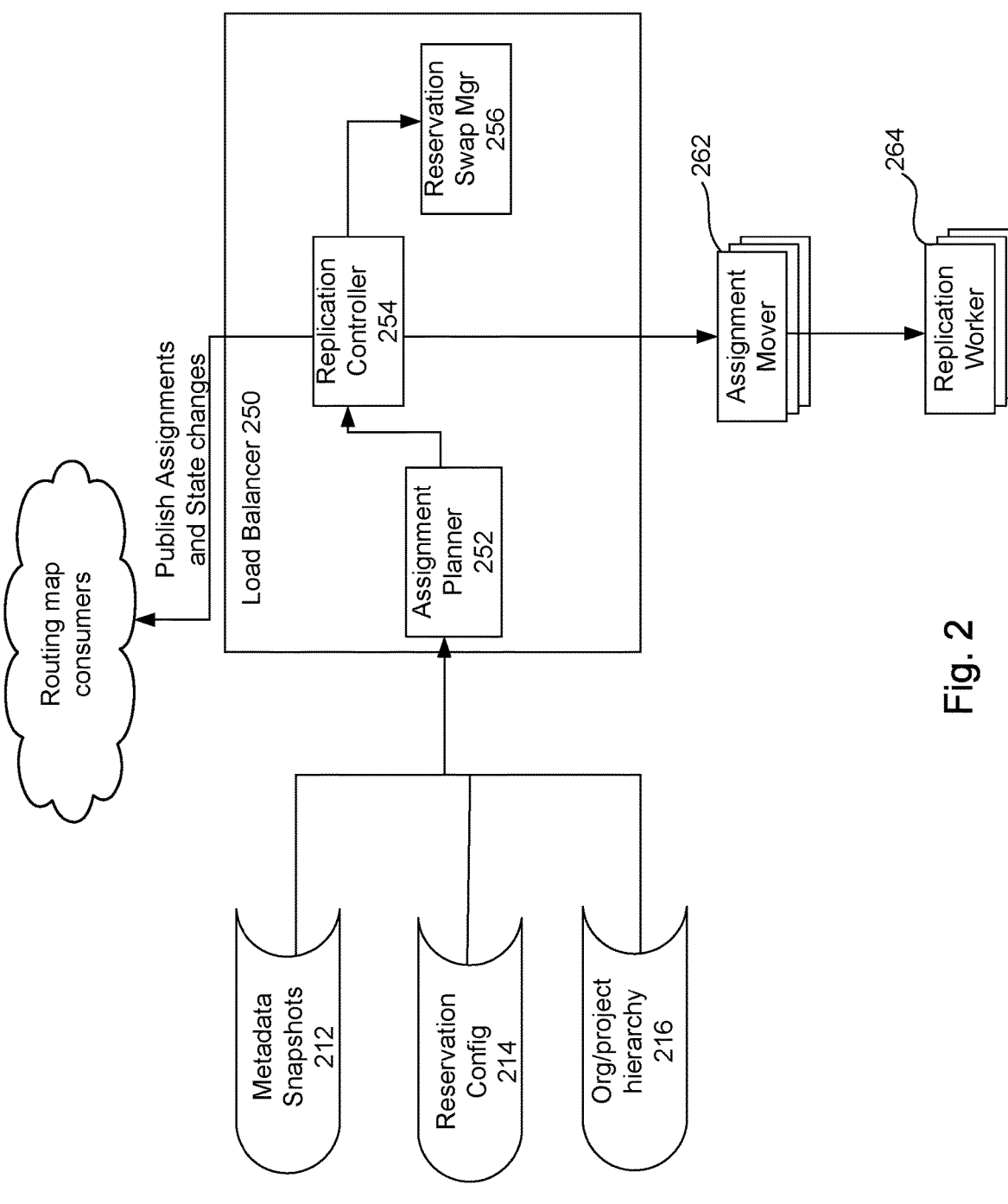
FIG. 2 is a block diagram of an example data assignment system according to aspects of the disclosure.

FIG. 2 illustrates an example architecture of a system for optimizing replication storage. The system may reside, for example, on a computing device in one of the datacenters 160-180 of FIG. 1, on the controller 190 of FIG. 1, or on some combination thereof. The system includes a load balancer 250, which may be responsible for assigning reservations to computation servers in a balanced fashion. For example, the load balancer 250 may balance allocation of tasks within a datacenter or among a global distributed system. The load balancer 250 may, for example, compute explicit project-to-server assignment mappings to achieve proper load balancing. It may handle both static query routing, when all servers are available, and dynamic query routing, when servers are drained. Additionally, the load balancer 250 may provide a robust way to publish these assignments to all components in a data analysis engine that use this information.

Datasets may be replicated two or more times, such as in a primary replica and a secondary replica. The load-balancer 250 and routing system runs queries in a location with the primary replica. The secondary replica is a backup, and will become the active location for query routing if the primary server is drained. This has more of an impact on the system when the replicas are tied to a reservation with pre-allocated slots. Compute capacity may be reserved for the primary servers, with the additional constraint that any single server could go down and the system could re-route queries to the secondary location without overloading any server.

The load balancer 250 may include an assignment planner 252, a replication controller 254, and a reservation swap manager 256. The assignment planner 252 may run as a sub-component in the load balancer 250. For example, the assignment planner 252 may be a module, such as a C++ or other type of module. In some instances, the assignment planner may replace an existing routing computation component. While in some examples a single assignment planner 252 may produce assignments for each region, in other examples additional or fewer assignment planners may be implemented. For example, an assignment planner may produce assignments for a globally distributed system, multiple assignment planners may be implemented within a given region, etc.

The assignment planner 252 is responsible for computing and publishing assignments. In computing the assignments, the assignment planner takes into account a variety of factors, such as a hierarchy (216) of the organization and projects to be assigned, on-demand compute consumption, storage volume (e.g., by organization), server storage and compute capacities, etc. In some examples, the assignment planner may also take into account compute reservations (214), such as resources guaranteed to a particular customer. To get the latest reservation information, for example, the assignment planner 252 may subscribe to periodic update, receive push notifications when new reservations are made, etc. The information considered by the assignment planner 252 in generating a new assignment scheme may include historical query information, such as metadata snapshots 212, datasets, and the like.

Periodically, the assignment planner 252 may fetch data from sources and predict future events, taking such predictions into account in determining assignments. For example, the assignment planner 252 may predict turndown, that a customer is about to send large amounts of data, potential reservation changes, etc. Such events may impact server size, project storage, or other constraints.

The assignment planner 252 may use a solver to compute a viable assignment. The solver may be, for example, a greedy algorithm, a mixed integer problem solver, or any other type of solver. Some example solvers are discussed in further detail below. It may further provide information regarding the computed assignment to replication controller 254. The replication controller 254 may be implemented as a library in the load balancer 250.

The assignment planner 252 may run continuously, on a schedule, on demand, or in response to an environmental change or configuration change. It may operate in a dry-run mode, where it generates assignments but does not apply them, or in an autonomous mode, where it automatically sends newly generated assignments to the replication controller 254 for immediate application.

Once new assignments are computed there will likely be some differences from the previous assignment. For example, a group of assignments, such as for a particular organization, may be moved from a first replica to a second replica. The replication controller 254 is responsible for moving data to conform to the new assignments, and cleaning up data in the previous locations. For example, the replication controller 254 may determine a replication plan of data transfer operations that would be necessary to implement the new assignments. The plan may include a number of data transfer and copy operations, as well as data removal operations to reclaim unused space. The replication plan may account for intermediate storage capacities, such that the amount of available storage is not exceeded even during times when data is in transit and may temporarily have more copies of the data than is needed in a static state.

According to some examples, the replication controller 254 may manage a state machine for each organization that needs to move to a new replica. In doing so, the replication controller 254 may start by adding the new replicas to that organization's replication configuration so that all new data starts going to the new replicas. The replication controller 254 further orders the moves to ensure that enough space is available to copy an entire organization. It further makes calls to replication workers 264 to perform copying of the data. When an organization's primary reservation needs to move between servers, the replication controller 254 submits a reservation move request to reservation swap manager (RSM) 256. The reservation may be moved, for example, when reservations are moved out of a destination server. Once data moves are done, a publishing mechanism of the load balancer 250 may push those changes to all servers involved in routing decisions.

The replication worker 264 may be a service that handles replicating storage at different metadata granularity. In some examples, it may be created by splitting replication specific functionality from replication queue handlers. It may be capable of replicating a single storage set or all storage for a table or range of tables. It may also support removing replicas.

The RSM 256 handles reservation moves and can perform reservation swaps when there isn't enough room for one reservation to move between servers. For example, if there are two servers with 1000 free slots each, and a 500 slot reservation wants to move from a first one of the two servers to a second one, it can just move because resources are available. However, if a 1500 and a 2000 slot reservation want to both move, they are swapped atomically. For example, the reservations may publish their intent, and when both reservations are ready, the swap is performed and both reservations move at the same time.

According to some examples, each of the assignment planner 252, replication controller 254, and reservation swap manager 256 may export dashboards for status, metrics, etc.

Figure 3:
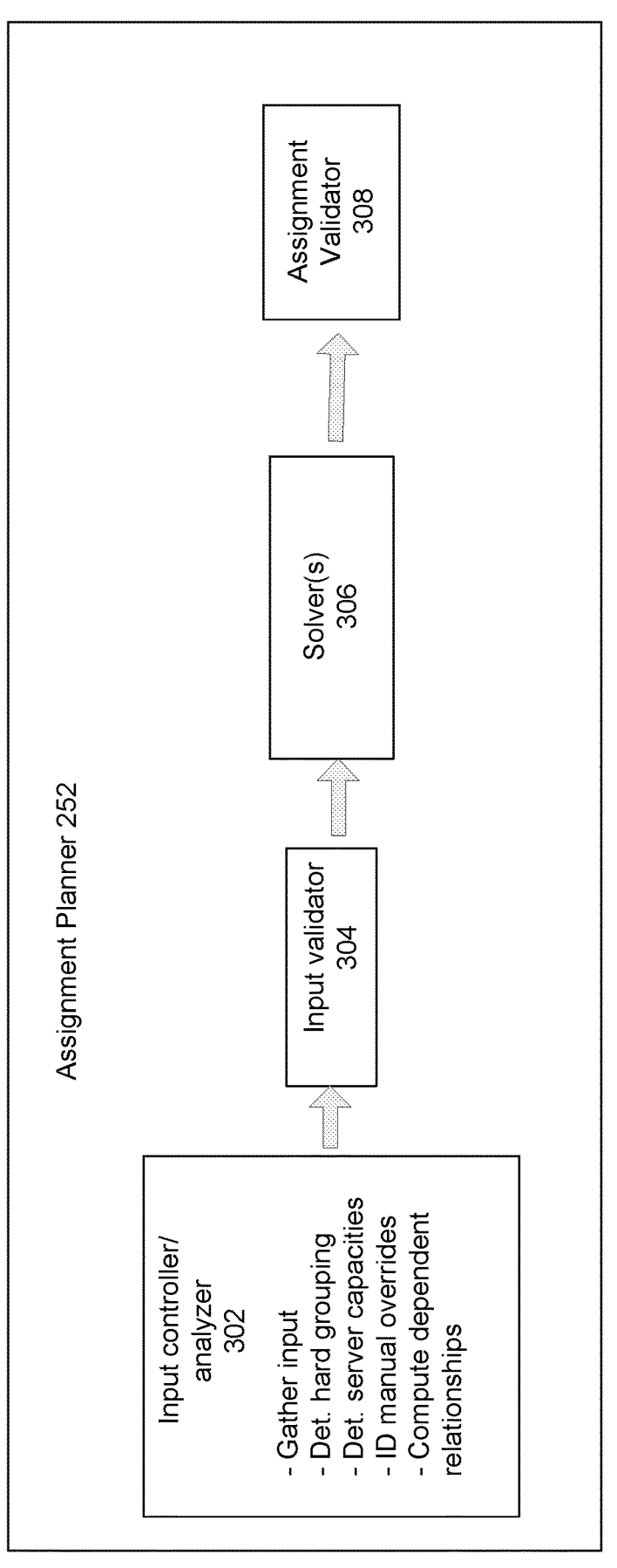
FIG. 3 is a block diagram of an example assignment planner according to aspects of the disclosure.

FIG. 3 illustrates an example of the assignment planner 252 in further detail. In this example, the assignment planner 252 includes a number of components, such as an input collector/analyzer 302, an input validator 304, one or more solvers 306, and an assignment validator 308. It should be understood that these components are merely examples, and that additional, fewer, or different components may be included in the assignment planner 252.

The input collector/analyzer 302 reads project usage inputs from metadata snapshots to determine a current size of committed data for each project. According to some examples, the data may be joined to project data from other sources to get organization information for each project. The input collector/analyzer 302 also obtains reservation information. For example, the reservation information may be read from a storage file designated for storing static reservation information or from another source.

The input analyzer/collector 302 may also determine groupings for projects and organizations. According to one example, small projects or organizations, such as those having 512 GB of data or less, may be distributed across the servers using a hashing strategy. For example, the small projects or organizations may be grouped into hash groups which are provided to the solver 306 for placement. The input analyzer/collector 302 may also determine hard groupings for data and create assignment groups, which may be given to the solver 306 as atomic units that cannot be split by the solver. For example, the assignment groups may include any of a stand-alone project, all of the projects in an organization, a hashed bucket of small organizations or projects, all of the projects in a reservation, etc. All projects in an assignment group may be placed on the same server.

Figure 4A:
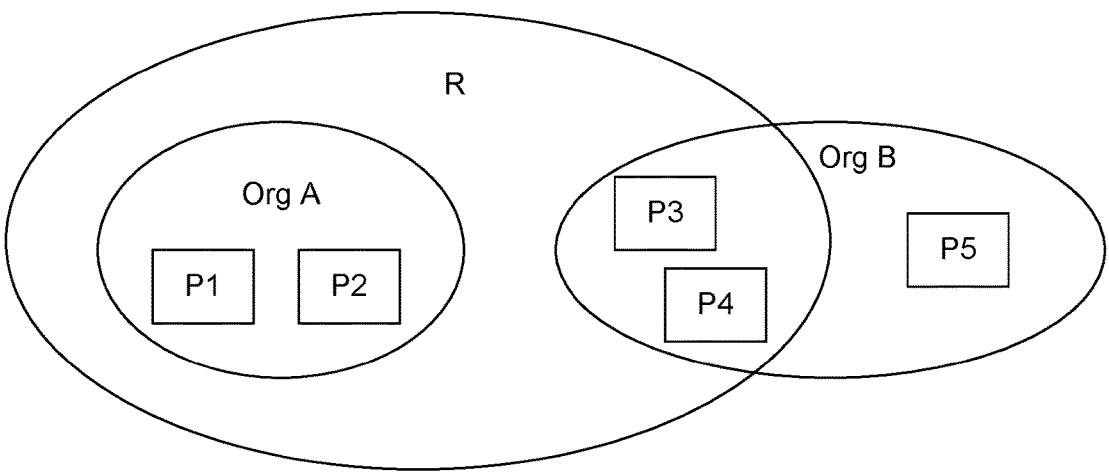
FIGS. 4A-4B illustrate example project groupings according to aspects of the disclosure.
Figure 4B:
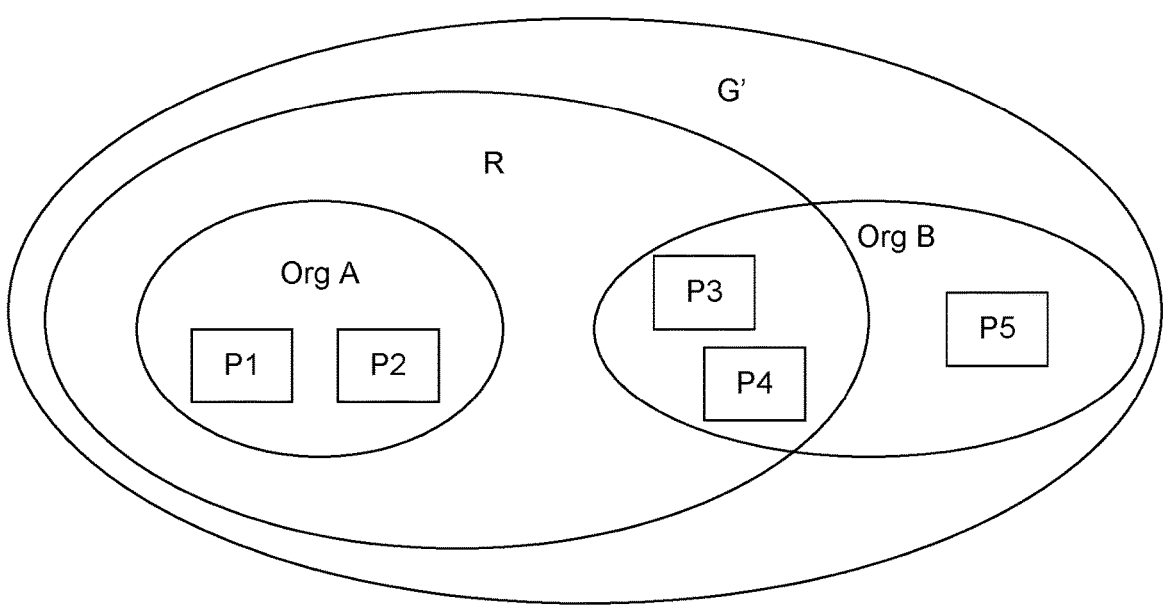

If there are cases where reservations include projects from multiple organizations, the assignment group for the reservation may be expanded to include all of the projects any organization touched by the reservation. For example, as shown in FIG. 4A, reservation R contains projects P1 and P2 from organization A and projects P3 and P4 from organization B, but it does not include all projects in organization B. Project P5 is not included in reservation R. Accordingly, as shown in FIG. 4B, the assignment group for reservation R is expanded to include all projects in organization B. In particular, assignment group G' is created, which covers all groups in reservation R and any covered organizations. In this case the assignment group would have the compute requirements of reservation R and the storage requirements of all included projects P1-P5. If project P5 were in a different reservation, Q, then the group G' would cover all projects in reservations R and Q as well. In this case, G' would have the compute requirements of both reservations R and Q combined.

The input analyzer/collector 302 may further determine an available capacity for each server. For example, it may receive an indication of such availability through an application programming interface (API) or any other direct or indirect communication with the servers. Data for any inputs or outputs of the system may have manual overrides. For example, manual overrides may be used if a server is intentionally being under-utilized or over-utilized to allow for planned capacity changes, a reservation change is planned, a project is expected to grow in size or compute requirements in the near future, etc. Data for manual overrides may be read from, for example, a configuration file and merged onto inputs gathered dynamically from other parts of the system.

The system may further compute dependency relationships. For example, the system may take a list of the groups and create a weighted graph based on query history. For example, the input collector/analyzer 302 may review the query history for a period of time, such as several days in the past, to determine which projects are related. According to some examples, the system may generate a graph of the related projects.

Figure 5:
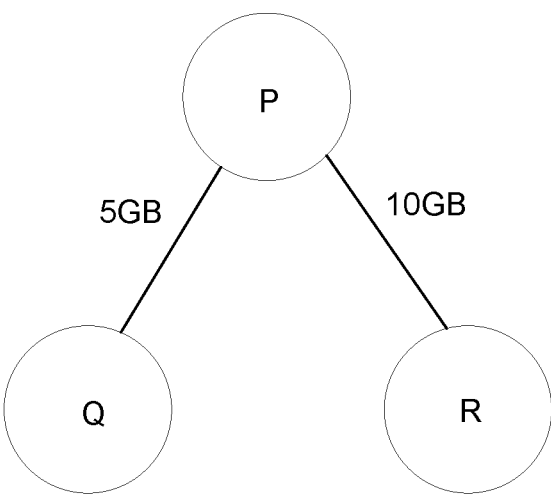
FIG. 5 is an example graph illustrating dependency relationships of projects according to aspects of the disclosure.

FIG. 5 illustrates an example graph of dependency relationships. According to this example, a query ran in project P read 5 GB from project Q and 10 GB from project R. Each job performed by the project P produces one or more edges between the node P and related nodes Q, R if the job required accessing information from projects Q, R. The edges for all jobs are summed to get the total weight (e.g., 5 GB, 10 GB).

Some projects may contain publicly visible or widely shared data which may be used by a large number of users external to the project owning the data. These frequently accessed data sets may have a large number of edges and create "super clusters" of linked nodes. These projects may be excluded from the graph dependency analysis and automatically replicated to all nodes. For example, the system may detect a threshold count of edges for a given project, and automatically fully replicate the project.

Input validator 304 may ensure that each input is correctly input to the system. For example, the input validator 304 may confirm that all required elements are present (e.g., each group has a valid, non-zero, size), all IDs in the graph of relationships are present in the list of inputs, etc. According to some examples, the input validator 304 may also confirm inputs relevant to primary and secondary replicas. For example, the input validator 304 may confirm that the relationship of the primary and secondary replicas is valid (e.g., both have the same storage requirement, and only the primary replica expresses a compute requirement), that primary and secondary replicas of the same group have weights with infinity, indicating that they should not be placed in the same server, etc.

The solver 306 takes the inputs and runs the assignment algorithm. The solver 306 may include a naïve solver, such as a greedy solver. In some examples, the solver 306 may further include an optimized solver, such as a mixed integer model. The solver 306 outputs an assignment map that assigns each project to a server.

The assignment validator 308 is run on the assignments output from the solver 306. The validator 308 may be, for example, a C++ class. The validator 308 verifies that an assignment set is a correct solution for the given inputs. It verifies that no hard constraints are violated. For example, it may verify that no server is over allocated in terms of compute or storage. The assignment validator 306 also may verify that all inputs are mapped to a location. The validator 308 may attempt to also analyze the "quality" of a solution in terms of how much data movement is required to implement that solution from the prior state and how balanced the assignments are across the available servers. For example, the validator 308 may assign a rating or a score to each particular solution. The determination of validity of each solution and the score may be stored in the distributed system.

As mentioned above, the solver 306 may perform one or more algorithms to generate the assignments. One example includes a greedy algorithm. For example, inputs to the process may include a list of n servers C 1 . . . C n with storage capacities CS 1 . . . CS n and compute capacities CC 1 . . . CC n, and a list of 2 m groups G 1 . . . G 2*m* with storage requirements GS 1 . . . GS 2*m* and compute requirements GC 1 . . . GC 2*m*. For each group G, there may be an assignment A (G)→C which maps the group to a server. The input collector 302 produces m groups of projects and then for each group generates 2 inputs to the assignment solver—one primary group and one secondary group which is a backup replica of the primary data. Further input to the solver may be a list of m anti-edges from G 1→G 2, G 3→G 4 . . . G 2*m*−1→G 2*m* with weight –Infinity, and a list of e edges, E 1 . . . E e, from groups G i to G j where for each edge i=1 j E n, there is a non-zero positive weight W (E n). The anti-edges represent a constraint that the primary and secondary replicas of a group should not be co-located on the same server. The edges represent data sharing relationships between the projects in the groups which are based on an empirical analysis of job history.

The greedy solver may be used with a Graph Connected Components (GCC) solver which takes a graph {N,E} of nodes N and edges E and returns a set of clusters, L. Each cluster L n is a set of groups from G. The storage requirement, LS n is ΣGS and the compute requirement LC n is ΣGC for all the groups in the cluster. The assignment function for a cluster, A (L n), returns the server with the greatest storage assigned to it among all of the groups in L n. According to some examples, this may be implemented as a machine learning model.

The greedy solver may perform a clustering of all groups with weights greater than some threshold. Initially the threshold may be 0, so all weights are considered on the first iteration. The clusters are ordered in decreasing order of compute requirement, then storage requirement. The solver may attempt to bin-pack the clusters using the existing assignment first. If the existing assignment cannot fit, it places the cluster in a server with the most compute capacity available if the cluster has compute requirements, else the server with the most available storage capacity. If no solution exists for this clustering, the solver increases the edge weight threshold, re-generates the clusters, and then re-runs the bin packing algorithm. Example pseudo-code for the greedy solver follows:

```
function Solve( G , E)
      determine W min and W max
      for w = W min to W max step (( W max – W min ) / 10)
            let E work = SET{ all edges e in E such that W( e ) > w }
            let L = GCC( { G, E work } )
            let S = BinPack( L , C )
            if S is a valid solution, return S
function BinPack( L , C )
      sort all of the clusters in L in decreasing order of LC n
      for each l in L where LC > 0
```

```
      If A (l) exists and is not full
            assign S (l) = A (l)
      else
            assign S (l) = C with greatest available compute
      capacity and no anti-edge
for each l in L where LC = 0
      If A ( l ) exists and is not full
            assign S ( l ) = A ( l )
      else
            assign S ( l ) = C with greatest available storage
            capacity and no anti-edge
return S
```

The greedy solver favors the current assignment and will not move an existing cluster away from its current assigned server as long as the server has the compute/storage capacity for the cluster. Data may be moved if clusters join together. For example if C i and C j become linked to form C ij then this new cluster may have a different assignment. Assume C i is the larger of the two clusters and that A(C i)≠A (C j). In this case, A(C ij) will be the same as the previous assignment A(C i) and C j will be moved.

Another example algorithm performed by the solver 306 is a mixed integer problem. One example of the mixed integer problem includes the following constants and variables:

| Constants | |
|---|---|
| Name | Description |
| CAPACITY(j, r) | Capacity of server j for resource r. |
| IS_BACKUP(i, r) | True if replica i 's consumption of resource r |
| IS_BACKUP(i, i', r) | is a backup for another replica (replica i' respectively). |
| MOVE_COST(i) | Cost of moving replica i to a different server. |
| PREVIOUS_SERVER(i) | Index of replica i 's previous assigned server, if any. |
| TRANSFER_COST(i, i') | Cost of assigning replicas i and i' to different servers. A cost of –infinity encodes that both replicas cannot be on the same server. |
| USAGE(i, r) | Usage of replica i for resource r. |

| Variables | |
|---|---|
| Name | Description |
| x(i, j) | Boolean variable, true if replica i is assigned to server j. |
| x(i, j, i', j') | Boolean variable, equivalent to x(i, j)x(i', j') |
| m(i) | Boolean variable, true if replica i was moved. |
| t(i, j) | Continuous variable, represents transfer costs incurred if replica i is assigned to server j. |

The model includes a number of constraints. For example, such constraints may include that each replica is assigned once, some replicas cannot be on a same server, servers have maximum capacities, bounds for move variables or transfer cost variables, etc. Such constraints may be expressed using the above constants and variables. For example, the constraint that each replica be assigned once may be expressed such that for all replicas i, sum_j x(i, j)=1. The constraint that some replicas cannot be on the same server may be expressed such that for all replicas i and i' for which TRANSFER_COST(i, =−infinity, for all servers j, x(i, j)+x (i', j)<=1. With regard to servers having maximum capacities, for all pairs of servers, all primary replicas assigned to j, and all secondary replicas assigned to j whose primary replica is assigned to j', must not go over server j's compute capacity. This covers the case where server j' is down, and secondary replicas of primaries assigned to j' must take over the compute load. For all servers j and j' with j≠j', for all resources r, sum_i x(i, j)*USAGE(i, COMPUTE)*IS_PRIMARY(i)+sum_i' (x(i, j', j)*USAGE(i', COMPUTE)* IS_BACKUP(i', i, COMPUTE))<=CAPACITY(j, COMPUTE. In binding move variables, for all i in replicas, m(i)>=1−x(i, PREVIOUS_SERVER(i)). In binding transfer cost variables, for all i in replicas, j in servers t(i, j)>=sum_i' sum_j'>j x(i', j')*TRANSFER_COST(i, i')−x(i, j)*(sum_i' TRANSFER_COST(i, i')). This constraint ignores replicas i' for which TRANSFER_COST(i, i') is equal to −infinity, and assumes TRANSFER_COST(i, i') is always positive or null. The objective of the mixed integer solver is to minimize the move cost: Minimize sum_i m(i)*MOVE_COST(i)+sum_j t(j).

Examples Methods

FIG. 6 illustrates an example method 600 for generating assignments of replicated data in a distributed system based on analysis of historical queries. The method may be executed at, for example, any device in the distributed system, such as a server, controller, load balancer, or other computing device. It should be understood that the following operations do not have to be performed in the precise order described below. Rather, various steps may be handled in a different order or simultaneously. Steps may also be added or omitted unless otherwise stated.

In block 610, data set commonly owned by a same organization are identified. For example, an online retailer may be a cloud computing/storage customer. The online retailer may have multiple projects, for example, where each project is owned by a different team within the company. For example, the online retailer may have tables related to operations, such as sales orders or inventory that are in one project. The retailer may also have projects relating to marketing or web analytics that are in different projects. The retailer may want to join the data together to find relations between marketing efforts and order history.

In block 620, the commonly owned data sets are automatically stored on a same device in the distributed system. For example, the commonly owned datasets may be grouped in a hard grouping that will not be separated during later group assignment processes. Referring to the online retailer example above, the sales project information and the marketing project information may be automatically stored together, such that frequent correlation of the projects can be done more efficiently. Common ownership may be determined, for example, by comparing identifiers in the metadata, each identifier corresponding to a particular organization.

In block 630, query logs for the distributed system are analyzed, for example, to identify relationships between data sets. For example, the query logs may include metadata snapshots, compute reservations, information regarding organization/project hierarchy, etc. The logs may provide an indication of how a given project accesses information of another project in a different organization. For example, the online retailer may have one or more affiliates, such as advertising agencies, marketing platforms, affiliated websites, etc. The online retailer may need to access data from the one or more affiliates, or vice versa, though the one or more affiliates may store such data in disparate areas, such as different servers, different datacenters, different regions, etc.

In block 640, projects having linked data sets are identified through the analysis of the query logs. For example, the query logs may reveal a history of transactions between the online retailer and the one or more affiliates over a past time period. The time period may be, for example, a number of hours, days, weeks, etc. immediately preceding the time of analysis. The data sets of the online retailer and the one or more affiliates that were accessed in those transactions in the query logs may thus be identified as being linked.

In block 650, projects with the most frequently linked data sets are stored on the same computing device in the distributed system. For example, a solver may be used to determine the data sets accessed most frequently, such as through generating a weighted graph or solving a mixed integer problem. This may also take into account a cost of each access, such as latency, priority, etc. In some examples, data sets may be weighted, scored, ranked, or otherwise evaluated to determine those most frequently accessed and/or those with a highest cost of access. For example, the online retailer may access affiliate ad agency data 3 times over the historic time period, with each access having a relatively low cost. The online retailer may also access affiliate website's data 50 times over the historic time period, with each access having a slightly higher cost. If the servers have only enough capacity to store the data for two of the three organizations, they may store the data for the online retailer and the affiliate mortgage analyst together in the same device.

The foregoing techniques are advantageous in that they provide for increased efficiency in storage of data, which translates to increased efficiency in computing and transactions. For example, by identifying data sets linked by transaction history, and storing those data sets together, future transactions involving both data sets may be performed with reduced latency.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method for optimizing replicated data storage, the method comprising:
analyzing, with the one or more processors, query logs for a distributed computing system;
identifying, with the one or more processors, projects with linked data sets in the query logs;
storing, with the one or more processors, storage data sets for the projects with the linked data sets on a same computing device in the distributed computing system to reduce a number of remote read transactions and associated latency to access data in the linked data sets, wherein storing storage data sets for the projects with the linked data sets on the same computing device includes storing, on the same computing device in the distributed computing system, two or more of the storage data sets that the query logs indicate have been joined by a single user query;

generating, with the one or more processors, a graph, wherein each of the identified projects is represented by a node in the graph; and identifying, with the one or more processors, clusters of projects connected by edges having weights greater than a predetermined threshold, and wherein a number of times two of the identified projects were linked in the query logs is represented by a weighted edge between the nodes presenting the two projects.

2. The method of claim 1, wherein storing the projects with the linked data sets comprises storing the identified clusters.

3. The method of claim 2, further comprising determining, with the one or more processors, data transfer operations required to implement an assignment map, wherein determining the data transfer operations comprises ensuring that an amount of available storage is not exceeded when data is copied from a source server to a destination server.

4. The method of claim 1, further comprising using a mixed integer programming model to identify clusters of projects based on linear relationships between projects.

5. The method of claim 4, wherein constraints for the mixed integer programming model include storage and compute capacities for each server, storage and compute requirements of each cluster, cumulative storage and compute requirements for each cluster must not exceed the storage and compute capacities for the server assigned to the cluster, each cluster has multiple replicas which must be stored on separate servers, data should remain on a server where it is already located where possible.

6. The method of claim 4, further comprising generating, with the one or more processors, an assignment map based on an output of the mixed integer programming model, the assignment map indicating where to store each cluster.

7. The method of claim 6, further comprising determining, with the one or more processors, data transfer operations required to implement the assignment map.

8. The method of claim 7, wherein determining the data transfer operations comprises ensuring that an amount of available storage is not exceeded when data is copied from a source server to a destination server.

9. A system for optimizing replicated data storage, comprising:

one or more memories storing a log of transactions between data sets in a distributed computing system over a period of time;

one or more processors in communication with the one or more memories, the one or more processors configured to:

analyze the log for a distributed computing system;

identify, based on the analysis of the log, projects with linked data sets;

store storage data sets for the projects with the linked data sets on a same computing device in the distributed computing system to reduce a number of remote read transactions and associated latency to access data in the linked data sets, wherein the one or more processors are configured to store storage data sets for the projects with the linked data sets on the same computing device including storing, on the same computing device in the distributed computing system, two or more of the storage data sets that the query logs indicate have been joined by a single user query;

generate a graph, wherein each of the identified projects is represented by a node in the graph; and identify clusters of projects connected by edges having weights greater than a predetermined threshold, and wherein a number of times two of the identified projects were linked in the query logs is represented by a weighted edge between the nodes presenting the two projects.

10. The system of claim 9, wherein the one or more processors are further configured to identify clusters of projects connected by edges having weights greater than a predetermined threshold.

11. The system of claim 10, wherein storing the projects with the most linked data sets comprises storing the identified clusters.

12. The system of claim 9, wherein the one or more processors are further configured to use a mixed integer programming model to identify clusters of projects based on linear relationships between projects.

13. The system of claim 12, wherein constraints for the mixed integer programming model include storage and compute capacities for each server, storage and compute requirements of each cluster, cumulative storage and compute requirements for each cluster must not exceed the storage and compute capacities for the server assigned to the cluster, each cluster has multiple replicas which must be stored on separate servers, data should remain on a server where it is already located where possible.

14. The system of claim 13, wherein the one or more processors are further configured to generate an assignment map based on an output of the mixed integer programming model, the assignment map indicating where to store each cluster.

15. The system of claim 14, wherein the one or more processors are further configured to determine data transfer operations required to implement the assignment map.

16. The system of claim 15, wherein determining the data transfer operations comprises ensuring that an amount of available storage in the servers is not exceeded when data is copied from a source server to a destination server.

17. A non-transitory computer readable medium storing instructions executable by a processor for performing a method of optimizing replicated data storage, the method comprising:

analyzing query logs for a distributed computing system;

identifying projects with linked data sets in the query logs;

storing the projects with the linked data sets on a same computing device in the distributed computing system to reduce a number of remote read transactions and associated latency to access data in the linked data sets, wherein storing storage data sets for the projects with the linked data sets on the same computing device includes storing, on the same computing device in the distributed computing system, two or more of the storage data sets that the query logs indicate were joined by a single user query;

generating, with the one or more processors, a graph, wherein each of the identified projects is represented by a node in the graph; and identifying, with the one or more processors, clusters of projects connected by edges having weights greater than a predetermined threshold, and wherein a number of times two of the identified projects were linked in the query logs is represented by a weighted edge between the nodes presenting the two projects.

* * * * *